(12) United States Patent
Liu

(10) Patent No.: US 6,819,462 B2
(45) Date of Patent: Nov. 16, 2004

(54) OPTICAL SCANNING APPARATUS OF LIGHT SOURCES WITH DIFFERENT WAVELENGTHS

(75) Inventor: Chen-Hao Liu, Hsinchu Hsien (TW)

(73) Assignee: Industrial Technology Research Institute, Hsinchu Hsien (TW)

( * ) Notice: Subject to any disclaimer, the term of this patent is extended or adjusted under 35 U.S.C. 154(b) by 0 days.

(21) Appl. No.: 10/612,960

(22) Filed: Jul. 7, 2003

(65) Prior Publication Data

US 2004/0165239 A1 Aug. 26, 2004

(30) Foreign Application Priority Data

Feb. 21, 2003 (TW) ........................................ 92103624 A (51) Int. Cl.[7] .............................................. G02B 26/08
(52) U.S. Cl. ...................................... 359/206; 359/210
(58) Field of Search ................................ 359/204–207, 359/209–210, 662, 618, 634; 347/232–233, 241–244

(56) References Cited

U.S. PATENT DOCUMENTS 5,216,534 A * 6/1993 Boardman et al. .......... 359/209

6,339,490 B1   1/2002 Hsu et al.

* cited by examiner

Primary Examiner—James Phan
(74) Attorney, Agent, or Firm—Birch, Stewart, Kolasch & Birch, LLP (57) ABSTRACT

The optical scanning apparatus of light sources with different wavelengths relates to an optical scanning apparatus with a plurality of light sources of different wavelengths. All the light beams generated by the different light sources passing through a collimator lens, a cylindrical lens, and a beam combiner to form a single or parallel beams. The single or parallel beams pass through a reflective lens, and then pass through one or more f-θ lenses installed on a rotating apparatus. Different arrangements of the reflective lens corresponding to the f-θ lenses achieve three different kinds of scanning: (1) light spots corresponding to different wavelengths scanning the same positions in order (2) light spots corresponding to different wavelengths scanning different positions simultaneously (3) light spots corresponding to different wavelengths scanning the same positions simultaneously.

36 Claims, 6 Drawing Sheets

OPTICAL SCANNING APPARATUS OF LIGHT SOURCES WITH DIFFERENT WAVELENGTHS

BACKGROUND OF THE INVENTION

1. Field of Invention

The present invention relates to optical scanning apparatus of light sources with different wavelengths that can be applied in an exposure light source for image development machines.

2. Related Art

The current development of optical scanning apparatus of light sources with different wavelengths is mostly used in optical laser printers. Please refer to FIG. 1 for the composing elements of laser printers, comprising of: laser sources (11, 12, 13), modulators (21, 22, 23), an optical beam combiner (30), a beam forming lens set (40), a rotary polygon (50) and an f-θ lens (60).

Figure 1:
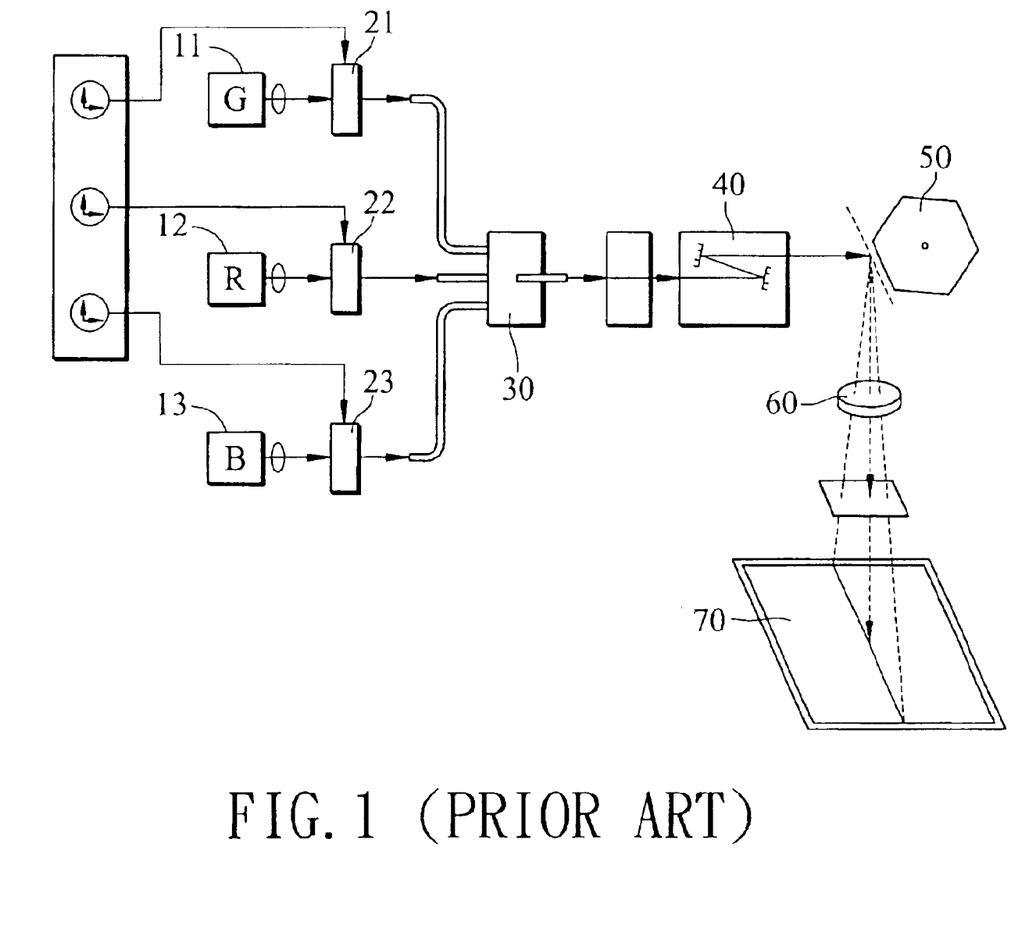
FIG. 1 illustrates the structure of the prior art technology (U.S. Pat. No. 6,031,561) of optical scanning apparatus for a plurality of light sources of different wavelengths.

The three laser light sources (11, 12, 13) generate three light beams with different wavelengths. The light beams pass through the modulators corresponding to the wavelengths (21, 22, 23), and they modulate an intensity of the light and the on/off time of each of the light sources. These light beams then pass through the optical beam combiner (30) and combine into a single beam.

Using the beam-forming lens set (40), the single beam left from the optical beam combiner (30) is focused, and the cross section shape of the beam is changed. The cross section shape can become oval, circular, or any other shape according to the needs of the users. The beam-forming lens set (40) can also make sure the light spots falling on the target (70) are the same size.

The light beam then passes through a rotary polygon (50). Through the rotation of the lens, the reflection angle of the light beam is changed as time goes by to scan the target (70). The light beam then passes through the f-θ lens (60), so one of the beams scanning, at uniform speed, is then capable of constant linear velocity scanning and focusing.

Therefore, to make the light spots of the different wavelengths the same size on the target (70), a set of f-θ lens (60) is designed. The corresponding light beams of three wavelengths can then focus, change the shape of the cross sections and achieve constant linear velocity scanning. However, the more light beams with different wavelengths, the more difficult it is to design the f-θ lens (60), sometimes even impossible. The current f-θ lens (60) is designed to allow linear scanning with constant speed for the wavelength of one of the light spots only, not for any other light spots. Under this condition, at any point in time, any two light spots emitted simultaneously (other than the central optic axis) cannot fall on the same position.

To simplify the described optical element in optical scanning apparatus for a plurality of wavelengths, the apparatus that is patented by U.S. Pat. No. 6,339,490 combines a rotary polygon (50) and f-θ lens (60), shown in FIG. 2. The f-θ lens (60) is installed on a rotating device (80) to emit the original rotating polygon (50), which still achieves linear scanning at a constant speed and simplifies the design of the optical element.

Figure 2:
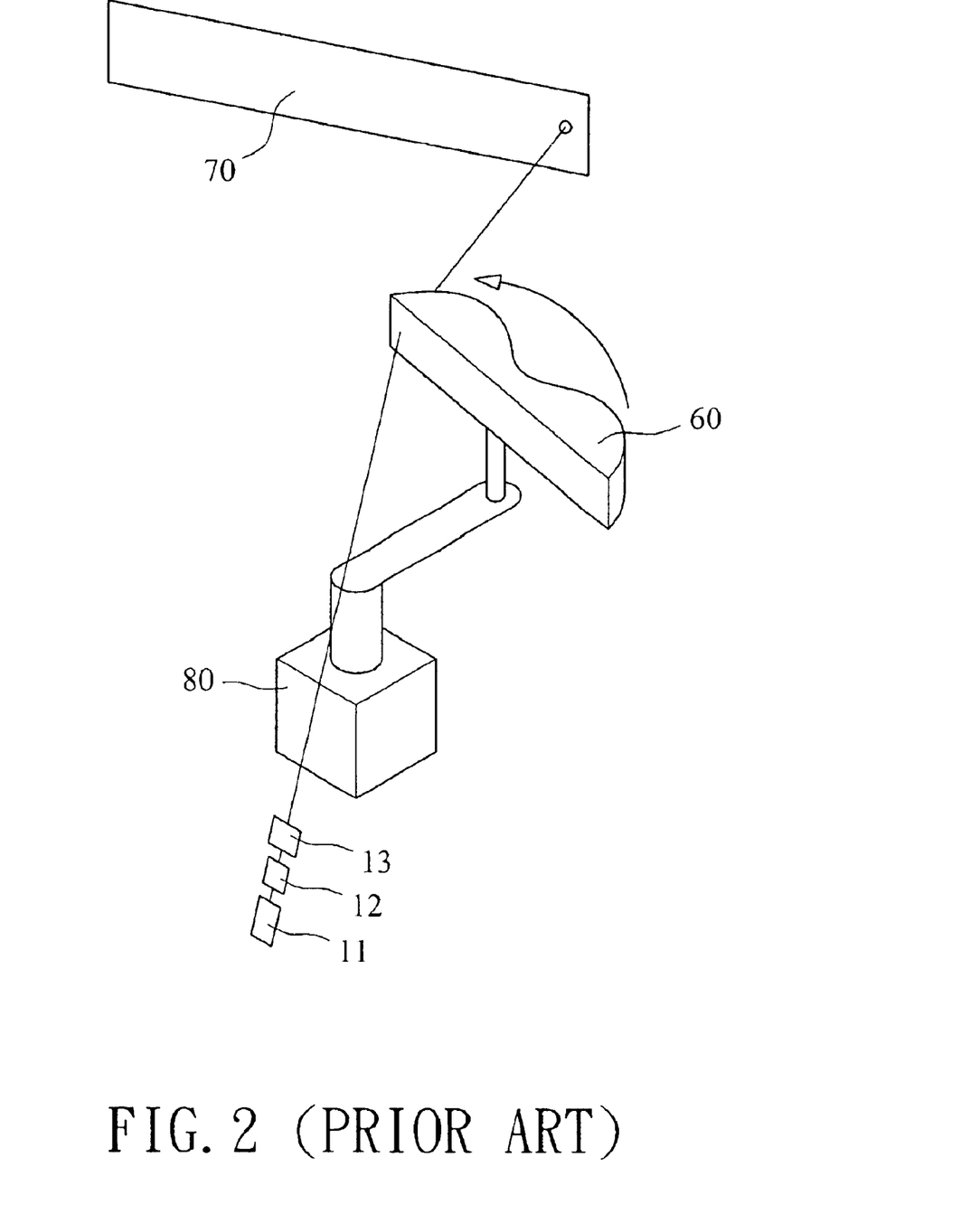
FIG. 2 illustrates the structure of the prior art technology (U.S. Pat. No. 6,339,490) of optical scanning apparatus for single wavelengths.

This known optical scanning apparatus is applied to laser printers, and used as the scanning technology for single wavelength light source. It cannot emit corresponding light spots of different wavelengths onto the same scanning position at the same time.

SUMMARY OF THE INVENTION

The invention is used to provide an optical scanning apparatus for a plurality of light sources of different wavelengths. By having the f-θ lenses for each of the light sources of different wavelengths symmetric to its the central optic axis, the design for the f-θ lens is simplified. Therefore, the light sources with different wavelengths can scan at the same constant linear velocity scanning.

The invention relates to optical scanning apparatus with a plurality of light sources of different wavelengths. All the light beams generated by different light sources pass through a collimator lens, a cylindrical lens, respectively, and then a beam combiner, to form single or multiple parallel beams. The single or multiple parallel beams of light pass through a reflective lens, and then through one or more f-θ lenses, installed on the rotating apparatus. Different arrangements of the reflective lens corresponding to the f-θ lenses achieve three different kinds of scanning: (1) light spots corresponding to different wavelengths scanning the same position in order (2) light spots corresponding to different wavelengths scanning different positions simultaneously (3) light spots corresponding to different wavelengths scanning the same position simultaneously.

Further scope of applicability of the present invention will become apparent from the detailed description given below. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given in the illustration below only, and thus are not limitative of the present invention.

DETAILED DESCRIPTION OF THE INVENTION

The invented optical scanning apparatus of a plurality of wavelengths provides three different kinds of scanning: (1) light spots corresponding to different wavelengths scan the same position in order, (2) light spots corresponding to different wavelengths are emitted at the same moment, the combined beam passes through an f-θ lens, as a result the three different beams scan different positions, (3) light spots corresponding to different wavelengths are shining at the same moment, the combined beam or beams pass through corresponding f-θ lenses so the three different beams scan the same position.

The first embodiment of the invention uses three corresponding light beams with different wavelengths to scan the same position. Please refer to FIG. 3 for the structure. The optical scanning apparatus comprises of the following: lasers (90a, 90b, 90c), collimator lenses (91a, 91b, 91c), cylindrical lenses (92a, 92b, 92c), optical beam combiner (100), the f-θ lenses (111, 112, 113) designed specifically for the three different wavelengths, and reflective lens (120).

Figure 3:
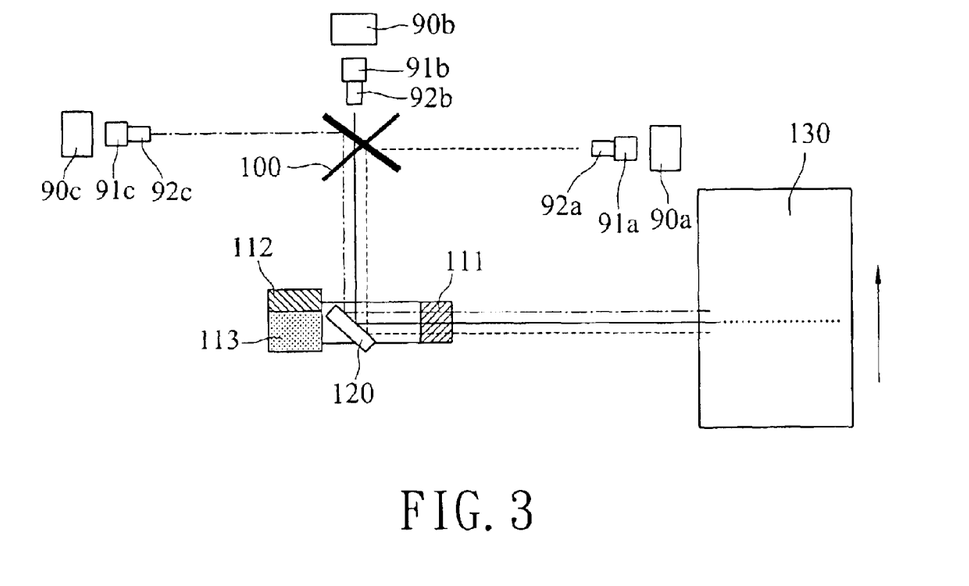
FIG. 3 illustrates the structure of the first embodiment of the invention.

The lasers (90a, 90b, 90c) generate the three light beams with different wavelengths. Each of the three light beams passes through a collimator lens corresponding to the lasers (90a, 90b, 90c) to form parallel beams as the output from the incoming light beams. The parallel light beams pass through the cylindrical lenses (92a, 92b, 92c) that output light beams with a cross section shape set by the design of the user: oval, circular, etc. The intensity of the output and the on/off time of the three lasers (90a, 90b, 90c) are modulated by the connected corresponding modulators.

Then, the three light beams changed by the cylindrical lenses (92a, 92b, 92c) pass through the optical beam combiner (100) and combine into an output beam as output. Users can set the numbers of the output beam. These numbers have to be less than or equal to the input number of light beams into the optical beam combiner (100). The output beams are perpendicular to the rotation platform when reaching the reflective lens and the arrangement of the output beams upon the platform is a straight line passing through the central of the rotating axis.

Figure 4:
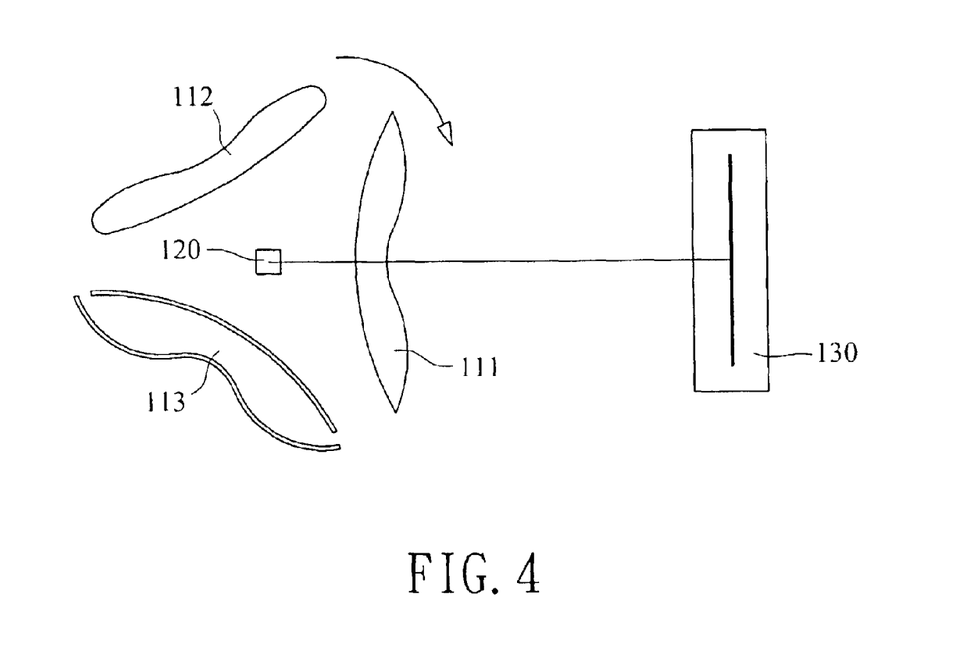
FIG. 4 illustrates the aerial view of the corresponding f-θ lenses for different laser wavelengths.

The output beams of the optical beam combiner (100) are reflected from the reflective lens (120) and then pass through three different f-θ lenses (111, 112, 113) corresponding to the wavelengths of the lasers (90a, 90b, 90c), please refer to FIG. 4 for illustration. The reflective lens (120) is disposed at the center of the rotating platform formed by the three f-θ lenses (111, 112, 113). Since the f-θ lenses are corresponding to the various wavelengths of the light sources, they have slightly different shapes. However, they are all symmetric to its central optic axis and installed on a rotating apparatus. Using the rotating apparatus, each of the f-θ lenses (111, 112, 113) is rotating continuously. The reflective lens (120), lasers (90a, 90b, 90c) and the optical beam combiner (100) are set up on a fixed device.

The central optic axes of each f-θ lenses (111, 112, 113) are set up on the rotating apparatus with an angle evenly dividing the circle of the platform. In the embodiment, the central optic axes of the adjacent f-θ lenses (111, 112, 113) are 120 degrees apart.

The f-θ lenses (111, 112, 113) are not installed on the same level, and the heights of the central optic axis of the f-θ lenses upon the rotating platform are differed by one third the central distance of adjacent light spots of the delivering object direction from the laser (90a, 90b, 90c) emitted onto the scanned object (130) in order, assuming each of the lasers (90a, 90b, 90c) on the scanned object (130) have light spots with the same central distance in delivering object direction. For example: the central optic axes of f-θ lens (111) and f-θ lens (112) have heights that are differed by one third the central distance of adjacent light spots from laser (90a), the central optic axes of f-θ lens (112) and f-θ lens (113) have heights that are differed by one third the central distance of adjacent light spots from laser (90a). Finally, the central optic axes of f-θ lens (111) and f-θ lens (113) have heights that are differed by two-thirds the central distance of adjacent light spots from laser (90a).

FIG. 3 illustrates the output light beams from an optical beam combiner (100) with different positions (corresponding to light sources with three different wavelengths). Since the scanned object (130) is moving at constant speed, the scanning light spot of the laser (90a) first falls on the scanned target (130) and then the scanning light spot from the laser (90b) falls on the scanned target (130). Finally, the scanning light spot from laser (90c) falls on the scanned target (130).

After the light spots generated from laser (90a, 90b, 90c) fall on the scanned object (130) and complete the scanning once, and the scanned object (130) constantly move the distance that is one third the central distance of adjacent light spots from the laser (90a), the light beams from the three spots (90a, 90b, 90c) can fall on the same position in order. So there are three light beams corresponding to different wavelengths scanning the same position in order.

The invention is an optical scanning apparatus of a plurality of light sources of different wavelengths, other than applied to scanning with light sources with three different wavelengths. The invention can also be used for scanning with more than three light sources of different wavelengths.

Figure 5A:
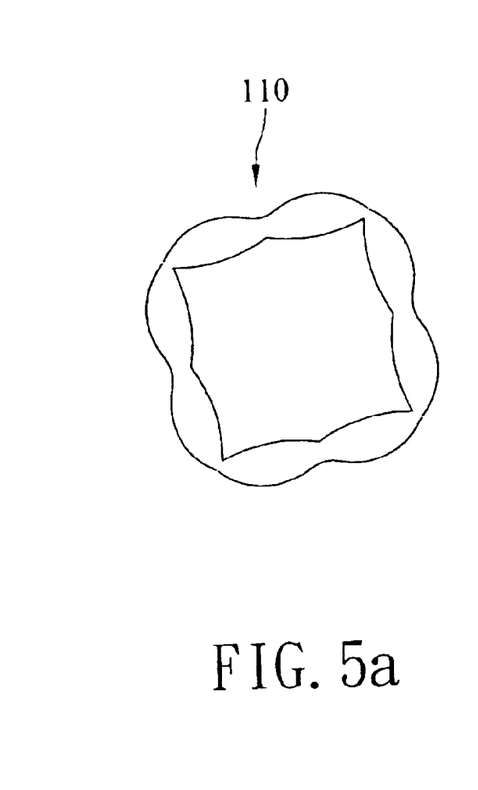
FIGS. 5a–5c illustrates the structure of different types of f-θ polygon.
Figure 5B:
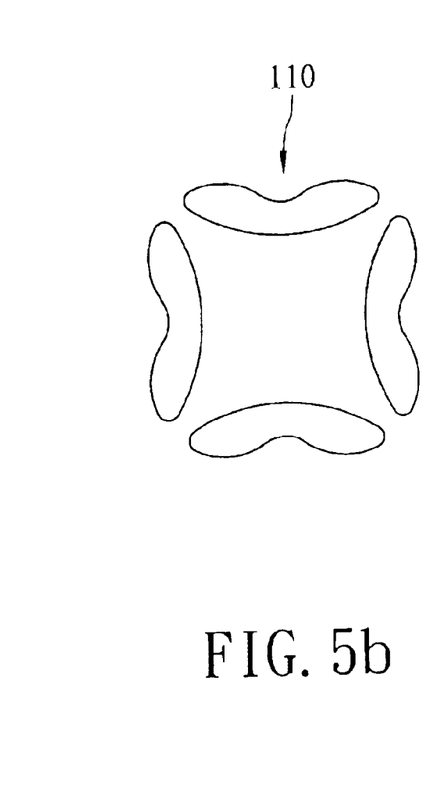
Figure 5C:
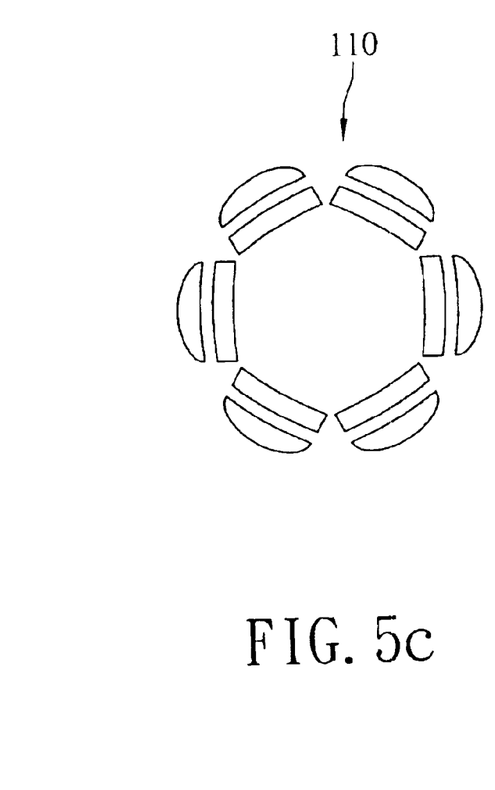

Focusing on the polygon f-θ lenses used in the scanning apparatus of a plurality of light sources of different wavelengths, FIGS. 5a–5c illustrates that each f-θ lens can be connected with another, or lined up to form a multi-sided polygon f-θ lenses (110). The f-θ lenses are positioned on a rotating device, and each f-θ lens is composed by one or more lenses. The polygon f-θ lenses (110) and the described f-θ lenses (111, 112, 113) are fabricated by selecting from the group consisting of unity injection molding and injection molding respectively with later assembly.

The second embodiment of the invention uses three light beams with different wavelengths that are emitted simultaneously and passed through a f-θ lens (114) corresponding to a specific wavelength, so the light spots of the different wavelengths scan three different positions at the same time. Please refer to FIG. 6 for the structure of this optical scanning apparatus, which is similar to the first embodiment.

Figure 6:
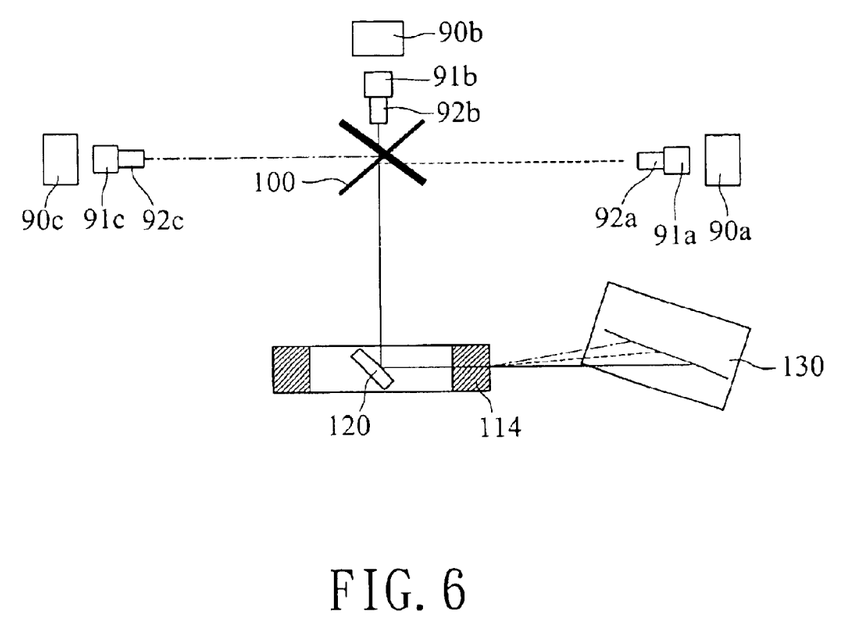
FIG. 6 illustrates the structure of the second embodiment of the invention.

The first embodiment uses f-θ lenses (111, 112, 113) and this embodiment uses several f-θ lenses (114) corresponding to one of the wavelengths of the three lasers (90a, 90b, 90c). They are also symmetric to their central optic axis and are installed on a rotating apparatus. Using the rotating apparatus, the f-θ lenses (114) rotate continuously. The center position of the rotating apparatus is a reflective lens (120); this lens and the optical combiner (100) are stationary and do not rotate with the f-θ lenses (114).

The output light beam of the optical combiner (100) is reflected by the reflective lens (120), then passes through the f-θ lenses (114) corresponding to a specific wavelength. The light spots from the lasers (90a, 90b, 90c) with different wavelengths then fall on different positions, so the light beams emitted simultaneously can scan three different positions. Only one of the light spots performs linear scanning at constant speed on the scanned target (130).

The third embodiment of the invention has three simultaneously emitted light beams with different wavelengths, passing through f-θ lenses (111, 112, 113) corresponding to different wavelengths, and then scanning the same position. Please refer to FIG. 7 for the structure of the optical scanning apparatus, which is similar to embodiments 1, and 2.

Figure 7:
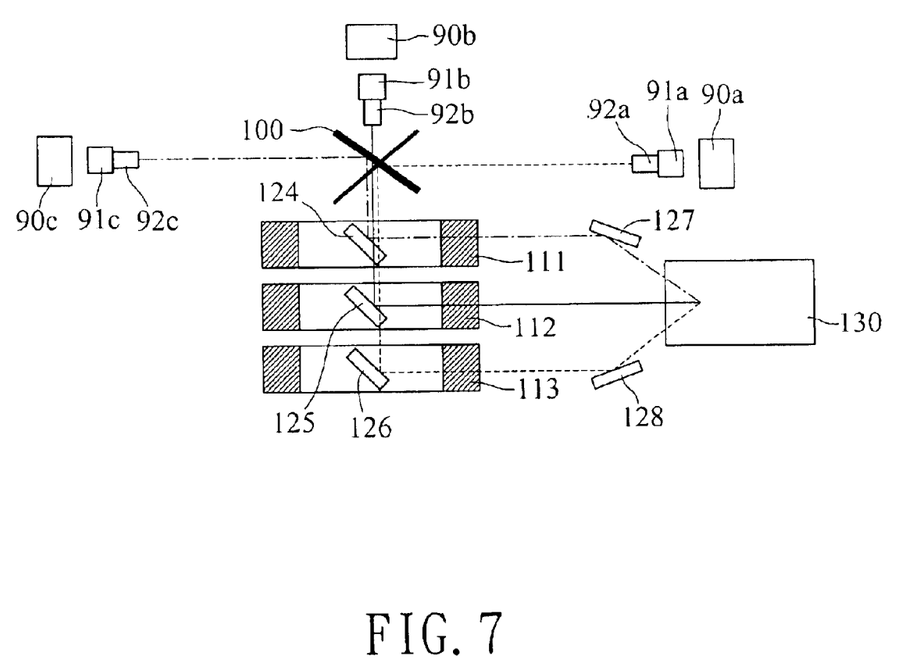
FIG. 7 illustrates the structure of the third embodiment of the invention.

The f-θ lenses (111, 112, 113) corresponding to different wavelengths of the lasers (90a, 90b, 90c) are parallel to each other and each f-θ lens is positioned symmetric to their central optical axes.

Each f-θ lens (111, 112, 113) is positioned on different rotating platforms, and these platforms are attached to a rotating device with the same rotating axis. The rotation device allows f-θ lenses (111, 112, 113) to rotate continuously, and produces linear scanning at constant velocity. The center position of each rotating platform has the first reflective lenses (124, 125, 126), and the surfaces are coated by special material such as titanium dioxide (TiO2) and silicon dioxide (SiO2). These special materials only reflect light beams of specific wavelengths, and other wavelengths pass through.

The optical beam combiner (100) and the stationary reflective lenses (124, 125, 126) outputs several parallel light beams, which are lined up the same way as the first embodiment. After the f-θ lenses (111, 112, 113) have deflect the light beams, the top and bottom two light beams need to be reflected by the second reflective lenses (127, 128); the middle light beams do not have to be reflected by the second reflective lenses. This allows three simultaneously emitted light spots with different wavelengths to fall on the same position of the scanned object (130), so the same positions of the scanned object (130) are linearly scanned at constant speed.

Figure 8:
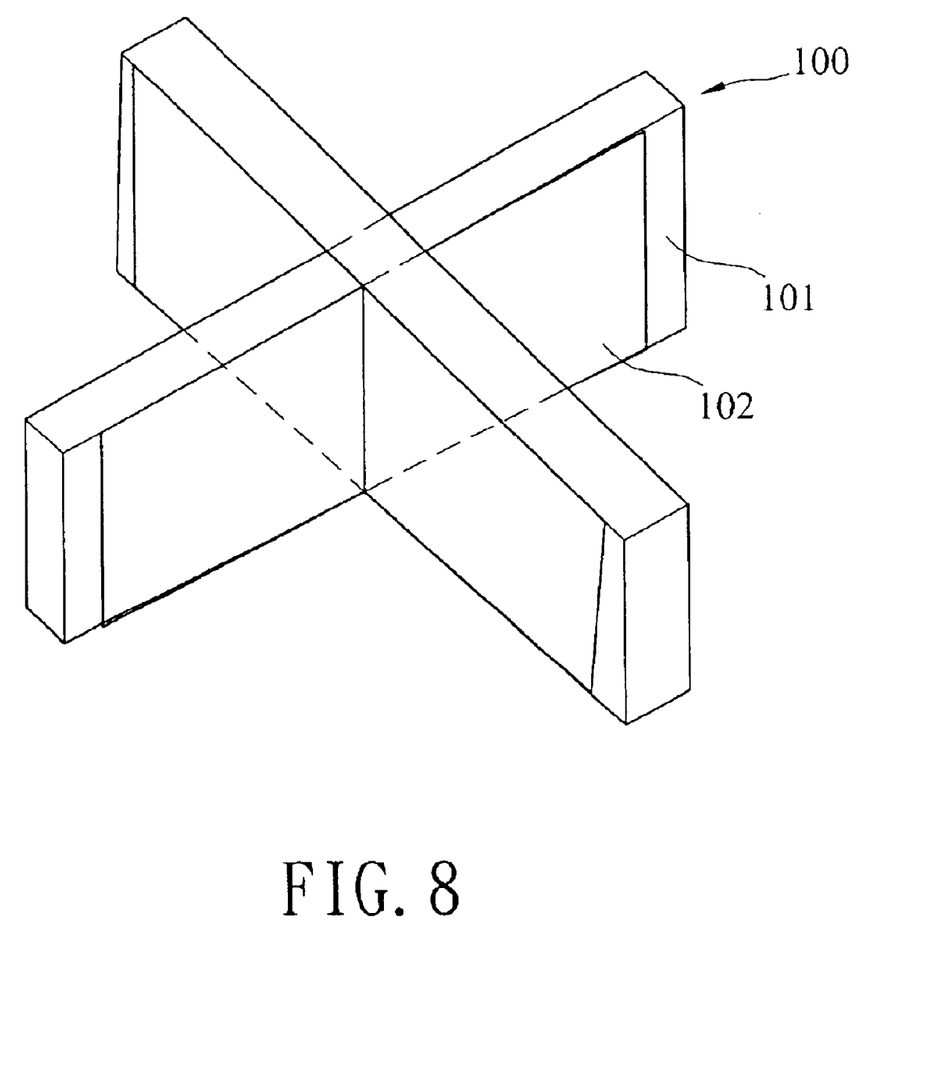
FIG. 8 illustrates the three-dimensional picture of the optical beam combiner.

Please refer to FIG. 8 for the three-dimensional picture of the optical beam combiner (100), which is formed by several layers of the substrate (101). The substrate (101) can be either glass or plastic. The surface of the substrate (101) is coated with plating material (102), including special ingredients such as titanium dioxide (TiO2) and silicon dioxide (SiO2). These special ingredients reflect lights of specific wavelengths and lights with other wavelengths pass through the substrate (101).

Using the characteristics of the material, lights of specific wavelengths are reflected. Therefore, the first reflective lenses (124, 125, 126) and the second reflective lenses (127, 128) are coated with special material to achieve the needed effect.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An optical scanning apparatus for light sources with different wavelengths, applying to light spots corresponding to different wavelengths scanning at the same position in order, comprising:

a plurality of light sources, generating a plurality of light beams of different wavelengths, each of the light beams passing through a collimator lens corresponding to each of the light sources to form a plurality of parallel beams as output;

a plurality of modulators, each of the modulators modulating an intensity and an on/off time of each of the light sources;

an optical beam combiner, combining the parallel beams from different directions into the same direction beams which users set the numbers of the output beam;

a reflective lens, reflecting the output beam generated from the optical beam combiner; and a plurality of f-θ lenses corresponding to the light sources of different wavelengths, installed on a rotating platform with a rotating apparatus, and the reflective lens disposed at the middle of the platform, each of the f-θ lens rotating continuously by the rotating apparatus to make the output beam passing through the optical beam combiner, the reflective lens, and the f-θ lenses to deflect onto a scanned object and to generate linear scanning at a constant speed.

2. The optical scanning apparatus of light sources with different wavelengths of claim 1, wherein the light sources are laser light sources.

3. The optical scanning apparatus of light sources with different wavelengths of claim 1, wherein the light sources further comprising a cylindrical lens corresponding to each of the light source to shape the cross-section of the parallel light beams passing through the collimator lenses.

4. The optical scanning apparatus of light sources with different wavelengths of claim 1, wherein the optical beam combiner is composed of a plurality of substrates and the surfaces of the substrates are coated with a special material to reflect light of specific wavelengths.

5. The optical scanning apparatus of light sources with different wavelengths of claim 4, wherein the substrate is selected from the group consisting of glass and plastic.

6. The optical scanning apparatus of light sources with different wavelengths of claim 4, wherein the special material is selected from the group consisting of titanium dioxide ($TiO_2$) and silicon dioxide ($SiO_2$).

7. The optical scanning apparatus of light sources with different wavelengths of claim 1, wherein the output beam from the optical beam combiner is parallel with an optic axis.

8. The optical scanning apparatus of light sources with different wavelengths of claim 1, wherein the reflective lens is used to reflect the output beams from the optical beam combiner to each of the f-θ lenses.

9. The optical scanning apparatus of light sources with different wavelengths of claim 1, wherein the rotating apparatus is rotating at a constant angular speed.

10. The optical scanning apparatus of light sources with different wavelengths of claim 1, wherein each of the f-θ lenses is symmetric to its central optic axis.

11. The optical scanning apparatus of light sources with different wavelengths of claim 1, wherein the central optic axes of each of the f-θ lens are set up on the rotating apparatus with an angle evenly dividing the circle of the platform, and the height of the central optic axes of each of the f-θ lens upon the platform are differed by one third the central distance of adjacent light spots from the light source emitted onto the scanned object in order.

12. The optical scanning apparatus of light sources with different wavelengths of claim 1, wherein the fabrication of the f-θ lens is selected from the group consisting of unity injection molding and injection molding respectively with later assembly.

13. An optical scanning apparatus for light sources with different wavelengths, applying to light beams corresponding to different wavelengths scanning different positions, comprising:

a plurality of light sources, generating a plurality of light beams of different wavelengths, each of the light beams passing through a collimator lens corresponding to each of the light sources to form a plurality of parallel beams as output;

a plurality of modulators, each of the modulators modulating an intensity and an on/off time of each of the light sources;

an optical beam combiner, combining the parallel beams into an output beam;

a reflective lens, reflecting the output beam generated from the optical beam combiner; and at least one f-θ lens corresponding to a single wavelength, installed on a rotating platform with a rotating apparatus, and the reflective lens disposed at the middle of the platform, each of the f-θ lens rotating continuously by the rotating apparatus to make the parallel beam passing through the optical beam combiner, the reflective lenses, and the f-θ lenses to deflect onto a scanned object and to make the light beams corresponding to different wavelengths scanning different positions.

14. The optical scanning apparatus of light sources with different wavelengths of claim 13, wherein the light sources are laser light sources.

15. The optical scanning apparatus of light sources with different wavelengths of claim 13, wherein the light sources further comprising a cylindrical lens corresponding to each of the light source to shape the cross-section of the parallel light beams passing through the collimator lenses.

16. The optical scanning apparatus of light sources with different wavelengths of claim 13, wherein the optical beam combiner is composed of a plurality of substrates and the surfaces of the substrates are coated with a special material to reflect light of specific wavelengths.

17. The optical scanning apparatus of light sources with different wavelengths of claim 16, wherein the substrate is selected from the group consisting of glass and plastic.

18. The optical scanning apparatus of light sources with different wavelengths of claim 16, wherein the special material is selected from the group consisting of titanium dioxide ($TiO_2$) and silicon dioxide ($SiO_2$).

19. The optical scanning apparatus of light sources with different wavelengths of claim 13, wherein the reflective lens is used to reflect the output beams from the optical beam combiner to each of the f-θ lenses.

20. The optical scanning apparatus of light sources with different wavelengths of claim 13, wherein the rotating apparatus is rotating at a constant angular speed.

21. The optical scanning apparatus of light sources with different wavelengths of claim 13, wherein the output beam from the optical beam combiner is parallel with an optic axis.

22. The optical scanning apparatus of light sources with different wavelengths of claim 13, wherein each of the f-θ lenses is symmetric to its central optic axis.

23. The optical scanning apparatus of light sources with different wavelengths of claim 13, wherein the fabrication of the f-θ lens is selected from the group consisting of unity injection molding and injection molding respectively with later assembly.

24. An optical scanning apparatus for light sources with different wavelengths, applying to light beams corresponding to different wavelengths scanning the same positions simultaneously, comprising:

a plurality of light sources, generating a plurality of light beams of different wavelengths, each of the light beams passing through a collimator lens corresponding to each of the light sources to form a plurality of parallel beams as output;

a plurality of modulators, each of the modulators modulating an intensity and an on/off time of each of the light sources;

an optical beam combiner, combining the parallel beams from different directions into the same direction beam which users set the numbers of the output beam;

a plurality of first reflective lenses, reflecting the output beam generated from the optical beam combiner; and a plurality of f-θ lens sets corresponding to the light sources of different wavelengths, installed on a plurality of a rotating platforms on top of a rotating apparatus, each of the f-θ lens corresponding to each of the light sources of different wavelengths are parallel to each other and rotating continuously by the rotating apparatus to make the parallel beams passing through the optical beam combiner, the reflective lenses, and the f-θ lenses to deflect, besides one of the parallel beam, the other parallel beams reflecting by a plurality of second reflective lenses corresponding to the wavelengths of the parallel beams to make the light beams with different wavelengths scanning the same positions simultaneously.

25. The optical scanning apparatus of light sources with different wavelengths of claim 24, wherein the light sources are laser light sources.

26. The optical scanning apparatus of light sources with different wavelengths of claim 24, wherein the light sources further comprising a cylindrical lens corresponding to each of the light source to shape the cross-section of the parallel light beams passing through the collimator lenses.

27. The optical scanning apparatus of light sources with different wavelengths of claim 24, wherein the optical beam combiner is composed of a plurality of substrates and the surfaces of the substrates are coated with a special material to reflect light of specific wavelengths.

28. The optical scanning apparatus of light sources with different wavelengths of claim 27, wherein the substrate is selected from the group consisting of glass and plastic.

29. The optical scanning apparatus of light sources with different wavelengths of claim 27, wherein the special material is selected from the group consisting of titanium dioxide ($TiO_2$) and silicon dioxide ($SiO_2$).

30. The optical scanning apparatus of light sources with different wavelengths of claim 24, wherein the first reflective lens is used to reflect the output beams from the optical beam combiner to each of the f-θ lenses.

31. The optical scanning apparatus of light sources with different wavelengths of claim 24, wherein the rotating apparatus is rotating at a constant angular speed.

32. The optical scanning apparatus of light sources with different wavelengths of claim 24, wherein the output beam from the optical beam combiner is parallel with an optic axis.

33. The optical scanning apparatus of light sources with different wavelengths of claim 24, wherein each of the f-θ lenses is symmetric to its central optic axis.

34. The optical scanning apparatus of light sources with different wavelengths of claim 24, wherein the first reflective lenses and the second reflective lenses are composed of a plurality of substrates and the surfaces of the substrates are coated with a special material to reflect light of specific wavelengths.

35. The optical scanning apparatus of light sources with different wavelengths of claim 34, wherein the substrate is selected from the group consisting of glass and plastic.

36. The optical scanning apparatus of light sources with different wavelengths of claim 34, wherein the special material is selected from the group consisting of titanium dioxide ($TiO_2$) and silicon dioxide ($SiO_2$).

* * * * *